United States Patent
Tamura et al.

(10) Patent No.: US 12,122,471 B2
(45) Date of Patent: Oct. 22, 2024

(54) MOTORCYCLE

(71) Applicant: KAWASAKI JUKOGYO KABUSHIKI KAISHA, Hyogo (JP)

(72) Inventors: Hiroshi Tamura, Kobe (JP); Takeshi Kashihara, Kobe (JP); Kiyotaka Akagi, Kobe (JP); Juichi Oyanagi, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 698 days.

(21) Appl. No.: 17/349,434

(22) Filed: Jun. 16, 2021

(65) Prior Publication Data

US 2022/0033022 A1    Feb. 3, 2022

(30) Foreign Application Priority Data

Jul. 30, 2020 (JP) ................. 2020-129716

(51) Int. Cl.
*B62J 17/10* (2020.01)
*B62J 17/06* (2006.01)

(52) U.S. Cl.
CPC .............. *B62J 17/10* (2020.02); *B62J 17/06* (2013.01)

(58) Field of Classification Search
CPC ............ B62J 17/02; B62J 17/06; B62J 17/10
USPC ....................................................... 296/78.1
See application file for complete search history.

(56) References Cited

U.S. PATENT DOCUMENTS

| 9,120,520 | B2 * | 9/2015 | Miyamoto | B62J 17/10 |
| 9,764,789 | B2 * | 9/2017 | Maeda | B62J 17/10 |
| 10,252,637 | B2 * | 4/2019 | Yamamoto | B60L 50/71 |
| 10,668,979 | B2 * | 6/2020 | Okada | B62K 19/48 |
| 11,912,366 | B2 * | 2/2024 | Niijima | B62J 17/06 |
| 2004/0251657 | A1 | 12/2004 | Kan et al. | |
| 2017/0183059 | A1 * | 6/2017 | Yamamoto | B62J 17/10 |
| 2018/0086406 | A1 | 3/2018 | Janyapanich et al. | |
| 2022/0297782 | A1 * | 9/2022 | Sawada | B62J 23/00 |
| 2022/0315154 | A1 * | 10/2022 | Hirano | B62K 11/04 |

FOREIGN PATENT DOCUMENTS

| EP | 2 889 207 | 7/2015 |
| JP | 2002-356189 | 12/2002 |
| JP | 2006-248418 | 9/2006 |
| JP | 2009-161027 | 7/2009 |
| JP | 2015-123765 | 7/2015 |
| JP | 2018-510092 | 4/2018 |

* cited by examiner

*Primary Examiner* — Jason S Morrow
(74) *Attorney, Agent, or Firm* — WENDEROTH, LIND & PONACK, L.L.P.

(57) ABSTRACT

A motorcycle includes a side cowl that covers a motorcycle body from an outside in a motorcycle width direction, and a cowl cover that partially covers the side cowl from the outside in the motorcycle width direction and is smaller than the side cowl. The cowl cover protrudes outward in the motorcycle width direction from the side cowl in a region in a height direction, in which the cowl cover is attached.

8 Claims, 5 Drawing Sheets

MOTORCYCLE

CROSS-REFERENCE TO RELATED APPLICATIONS

This application claims priority of Japanese Patent Application No.: 2020-129716 filed on Jul. 30, 2020, the contents of which are incorporated herein by reference.

BACKGROUND OF THE INVENTION

Technical Field

The present invention relates to a motorcycle.

Related Art

JP 2002-356189 A discloses a guard member that receives an impact force when a motorcycle turns over.

SUMMARY

In a structure of JP 2002-356189, the guard member is attached to lower end portions of left and right down tubes. In some cases, when the motorcycle turns over, a posture of a motorcycle body may change and a motorcycle body portion above the guard member may be damaged. Repair cost for repairing the motorcycle body portion may be incurred.

An object of the present invention is to provide a motorcycle capable of reducing repair cost.

The present invention provides a motorcycle including a side cowl that covers a motorcycle body from an outside in a motorcycle width direction, and a cowl cover that partially covers the side cowl from the outside in the motorcycle width direction and is smaller than the side cowl. The cowl cover protrudes outward in the motorcycle width direction from the side cowl in a region in a height direction, in which the cowl cover is attached.

According to the present invention, since the cowl cover protrudes outward in the motorcycle width direction from the side cowl in the region in the height direction, in which the cowl cover is attached, it is easy for the cowl cover to be grounded ahead of the side cowl when the motorcycle turns over. Accordingly, the damage of the side cowl is suppressed. Even though the cowl cover is damaged, since the cowl cover is smaller than the side cowl, the repair cost can be reduced as compared with a case where the side cowl is replaced.

In accordance with the motorcycle according to the present invention, the repair cost can be reduced.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Figure 1:
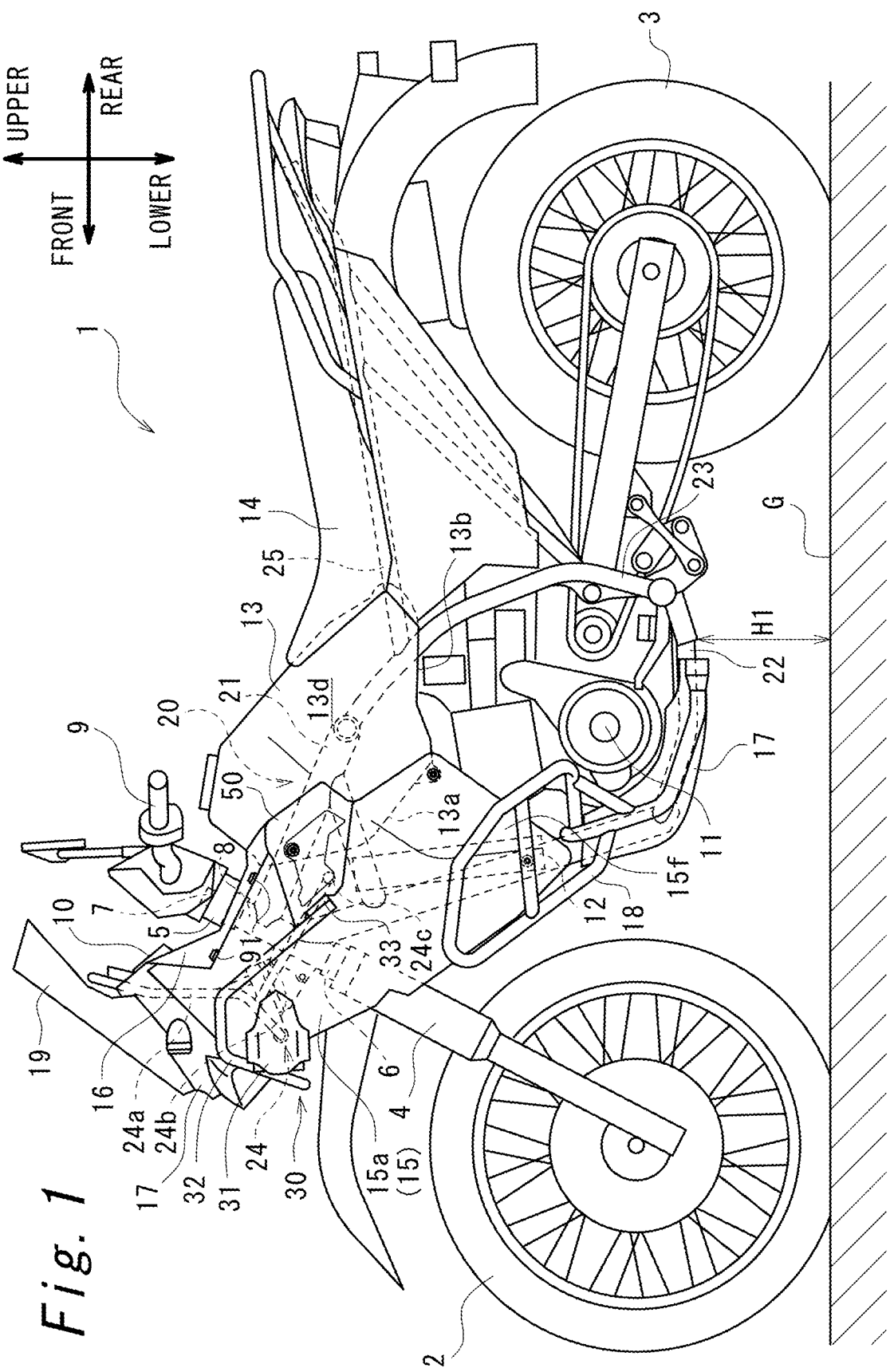
FIG. 1 is a side view of a motorcycle according to an embodiment of the present invention.

FIG. 1 is a left side view of a motorcycle 1 according to an embodiment of the present invention. The concept of a direction used in the present embodiment will be described as being consistent with the concept of a direction seen by a driver riding on the motorcycle 1.

As illustrated in FIG. 1, the motorcycle 1 includes a front wheel 2 and a rear wheel 3. The front wheel 2 is rotatably supported by a lower portion of a front fork 4 extending substantially in an up-down direction. The front fork 4 is supported by a steering shaft 7 via an upper bracket 5 provided at the upper end portion thereof and a lower bracket 6 provided below the upper bracket 5. The steering shaft 7 is rotatably supported by a head pipe 8.

A handlebar 9 extending to the left and right is attached to the upper bracket 5. The front wheel 2 is steered with the steering shaft 7 as a rotation axis by a swinging operation of the driver of the handlebar 9 to the left and right. A meter display device 10 that displays a motorcycle speed, an engine speed, and the like is disposed in front of the handlebar 9.

A motorcycle body frame 20 includes an upper frame member 21 extending rearward from the head pipe 8, a lower frame member 22 extending downward from the head pipe 8 and then extending rearward, and a rear frame member 23 that connects to a rear end portion of the upper frame member 21 and a rear end portion of the lower frame member 22. A boundary between the upper frame member 21 and the rear frame member 23 is located at a substantially central portion of a fuel tank 13 to be described later in a front-rear direction. A front cowl stay 24 is connected to a front portion of the head pipe 8. A seat frame 25 extending rearward is connected to a rear portion of the rear frame member 23.

The front cowl stay 24 has a stay body 24a extending in the up-down direction and a pair of left and right sub-stays 24b (only one side is illustrated in FIG. 1) extending rearward from the stay body 24a on both sides of the motorcycle body frame 20. An accessory fixing portion 24c to which an accessory to be described later is attached is provided at the rear end portion of the sub-stay 24b.

In the motorcycle 1, a minimum ground clearance of the motorcycle body frame 20 is set to be high, and a minimum ground clearance H1 in the lower frame member 22 is set to, for example, 220 mm or more. It is assumed that the minimum ground clearance H1 in the present specification is measured in a 1G state in which only a motorcycle weight acts on the motorcycle 1. The motorcycle 1 is configured as a motorcycle having a high ground clearance, and may satisfy at least one of the following descriptions, for example. The motorcycle may be a type of motorcycle in which the driver rides with his or her back straight. A top portion of the fuel tank 13 may be disposed in front of an intermediate position of the fuel tank 13 in the front-rear direction. The handlebar 9 may be disposed above the top portion of the fuel tank 13. The handlebar 9 may be disposed at a location extending upward from the upper bracket 5. The handlebar 9 may be an up handle extending upward from the upper bracket 5. A side mirror may be provided at the handlebar 9. An upper end of a windshield 19 may be located in front of the handlebar 9.

An engine 11 is mounted in a space inside the motorcycle body frame 20. Specifically, the engine 11 is surrounded by the upper frame member 21, the lower frame member 22, and the rear frame member 23. The engine 11 has a crankcase, a cylinder, and a cylinder head in this order from the bottom.

In the space inside the motorcycle body frame 20, a radiator 12 is disposed adjacent to a front side of the engine 11. The radiator 12 is supported by the lower frame member 22. Cooling water circulated in the engine 11 is cooled by the radiator 12. Accordingly, the engine 11 is configured as a water-cooled engine.

The fuel tank 13 is disposed so as to straddle the upper frame member 21 and an upper portion of the rear frame member 23 to the left and right. The fuel tank 13 is located adjacent to rear upper portions of side cowls 15 to be described later. A driver's seat 14 is disposed on a rear side of the fuel tank 13. The driver's seat 14 is supported from below by the seat frame 25.

The fuel tank 13 extends forward and upward so as to be inclined upward to the front as a whole. In side view, the fuel tank 13 has a lower edge portion that includes a lower edge portion front portion 13a that is located in the front half, extends in a direction inclined upward to the front along an extending direction of the fuel tank 13, and further extends to be curved forward and upward at a steeper angle, and a lower edge portion rear portion 13b that is located in the rear half and extends in a substantially horizontal direction.

Figure 2:
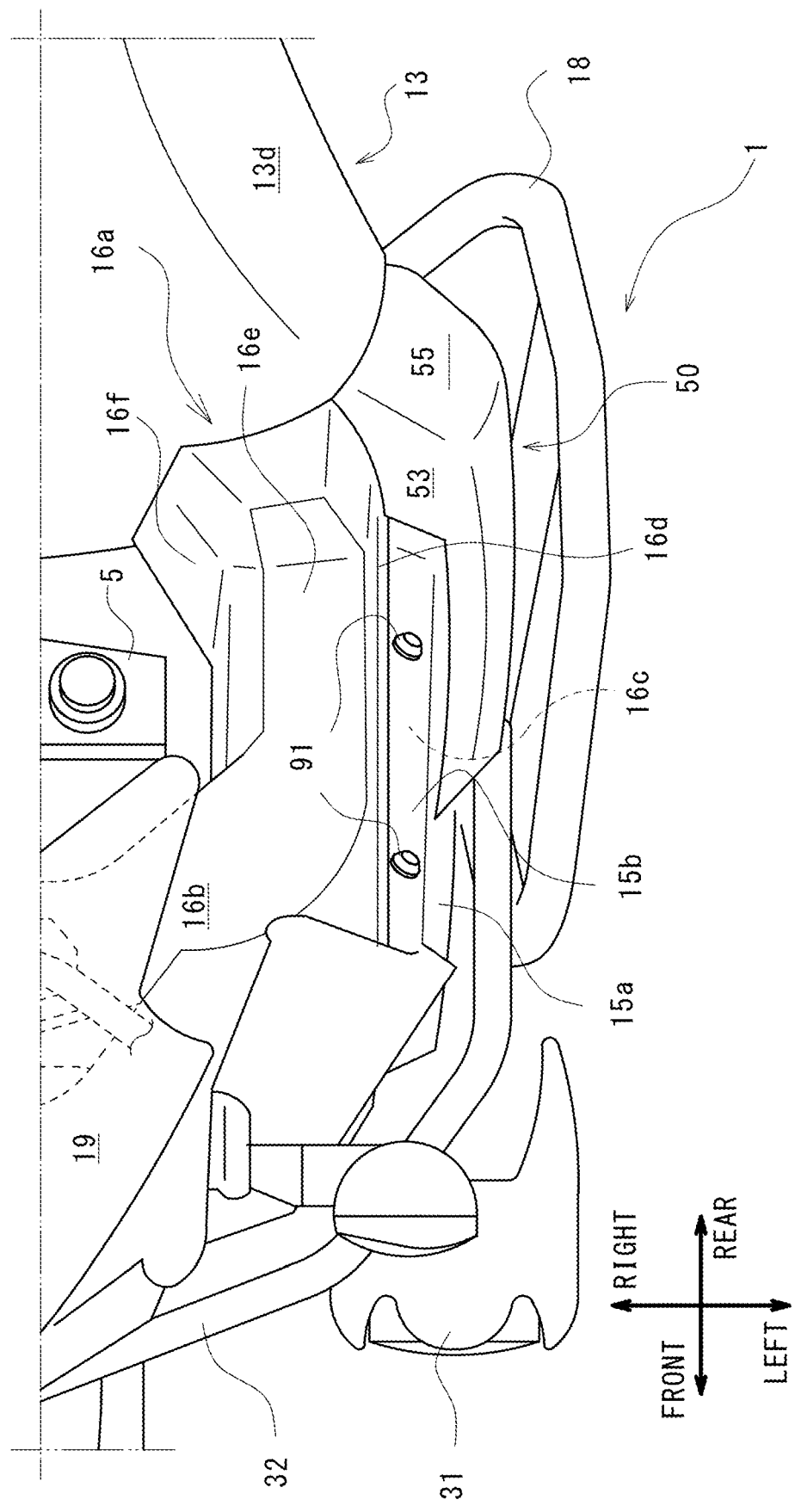
FIG. 2 is a top view of a left front half of the motorcycle.

FIG. 2 is a top view of the front half of the motorcycle 1. In FIG. 2, the handlebar 9 is omitted. Also referring to FIG. 2, knee grip portions 13d are formed on both side portions of the fuel tank 13 in a motorcycle width direction such that a dimension in the motorcycle width direction becomes smaller toward the driver's seat 14 in the rear from a portion in front than a central location in the front-rear direction, and are formed so as to be sandwiched between legs of an occupant. In other words, both side portions of the fuel tank 13 are formed to be wider to the front in the motorcycle width direction. The knee grip portions 13d are located in front of and in the rear of a front end of the seat 14, and are located below an upper surface of the seat 14.

As illustrated in FIG. 1, the motorcycle 1 has a pair of left and right side cowls 15 that cover a front upper portion of the motorcycle body from both sides, a meter panel 16 provided on upper edge portions of the side cowls 15, and a front cowl 17 that covers an upper portion of the motorcycle body from the front. The side cowls 15 and the front cowl 17 are made of resin, and an outer surface is painted. In the present specification, the motorcycle body refers to the motorcycle body frame 20 and the parts supported by the motorcycle body frame 20 (for example, the engine 11, the radiator 12, and the like) except for cover members constituting an outer shell of the motorcycle 1 such as the side cowls 15, a meter panel 16, and the front cowl 17.

The side cowl 15 has a cowl body 15a that covers the lower edge portion front portion 13a of the fuel tank 13 from an outside in the motorcycle width direction and extends forward from the lower edge portion front portion 13a approximately along a plane parallel to the up-down direction and front-rear direction, and a cowl upper wall portion 15b (see FIG. 2) that bends an inside in the motorcycle width direction and extends inward in the motorcycle width direction from an upper end portion of the cowl body 15a. The side cowls 15 are fastened to the meter panel 16 by three fastening bolts 91 on the cowl upper wall portion 15b on the left and right sides (see FIG. 5).

The cowl body 15a has a knee grip portion 15f recessed to the inside in the motorcycle width direction at the rear portion. The knee grip portion 15f is formed so as to be continuous with a lower side of the knee grip portion 13d formed in the fuel tank 13. The knee grip portion 15f extends downward from an upper end portion in a direction inclined forward and then extends downward. In the cowl body 15a, a width of a front side portion of the knee grip portion 15f in the motorcycle width direction gradually decreases to the front. Accordingly, in the cowl body 15a, a portion adjacent to a front side of the knee grip portion 15f is formed to be relatively wide. In the present embodiment, the side cowls 15 are arranged so as to cover both side portions and the front of the radiator 12 (see FIG. 1), and also exhibit a function of a radiator shroud.

Figure 3:
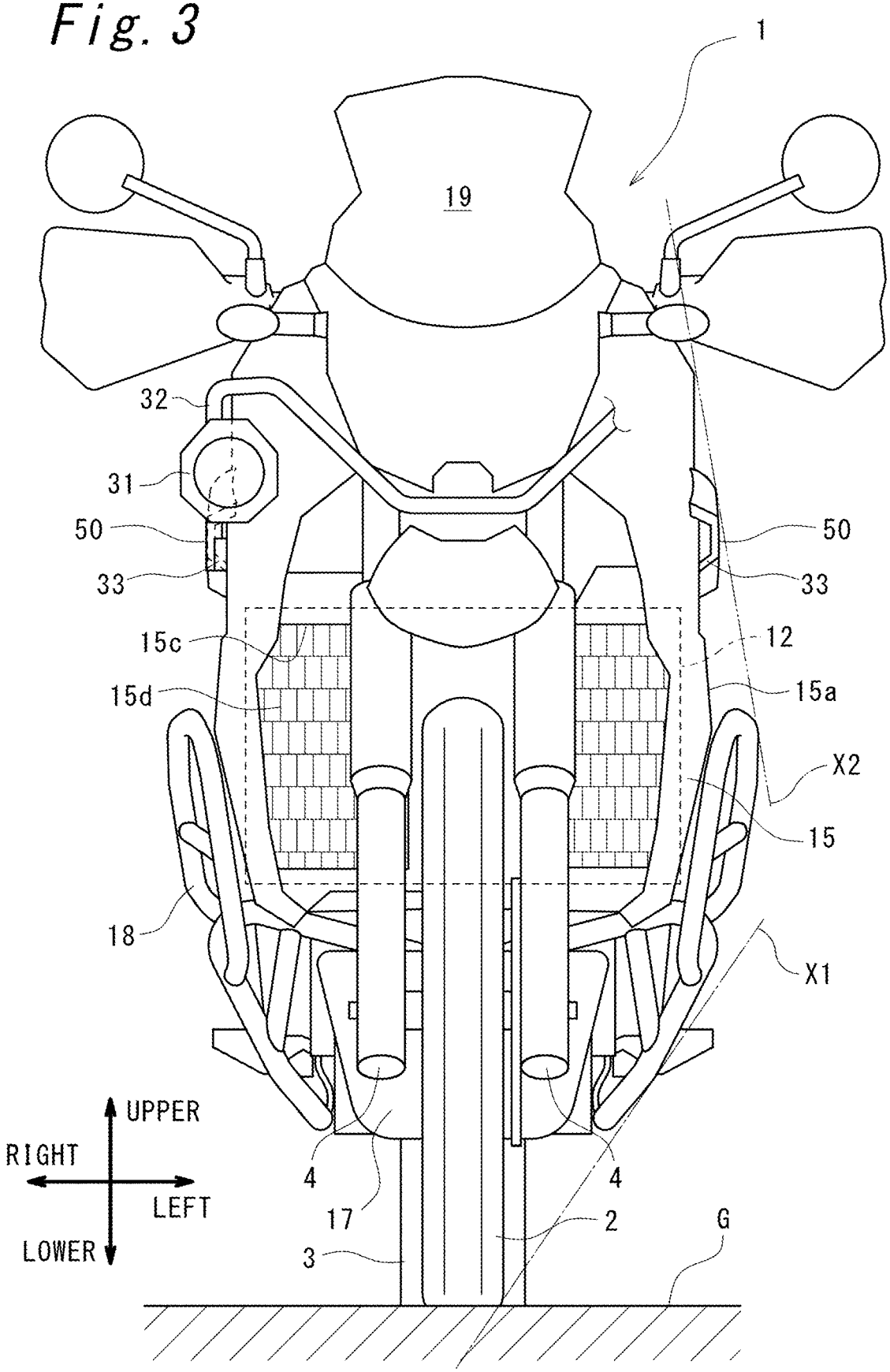
FIG. 3 is a front view of the motorcycle.

FIG. 3 is a front view of the motorcycle 1. As illustrated in FIG. 3, radiator vents 15c open in the front-rear direction so as to correspond to the radiator 12 are formed on front end surfaces of the side cowls 15. A grid-like radiator grill 15d is disposed in the radiator vent 15c. Accordingly, running wind introduced from the radiator vents 15c through the radiator grills 15d is efficiently guided to the radiator 12 by the side cowls 15.

As illustrated in FIG. 2, the meter panel 16 includes a pair of left and right meter panel side portions 16a extending to the inside in the motorcycle width direction from both left and right upper edge portions of the side cowl 15 toward the upper bracket 5, and a meter panel front portion 16b extending in the front-rear direction to the windshield 19 in front of the upper bracket 5. The meter panel front portion 16b covers a periphery of the meter display device 10.

The meter panel side portion 16a has a U-shaped section in which a sectional shape orthogonal to the front-rear direction is open downward such that a portion located inside from the cowl upper wall portion 15b in the motorcycle width direction protrudes upward from the cowl upper wall portion 15b. Specifically, the meter panel side portion 16a has a bottom wall portion 16c which extends substantially in the horizontal direction and to which the cowl upper wall portion 15b is fastened from above, an outer wall portion 16d which extends upward from an inner end portion in the motorcycle width direction of the bottom wall portion 16c, a top wall portion 16e which extends to the inside in the motorcycle width direction from an upper end portion of the outer wall portion 16d, and an inner wall portion 16f which extends downward from an inner end portion in the motorcycle width direction of the top wall portion 16e.

As illustrated in FIG. 1, the motorcycle 1 includes a frame slider 18. The frame slider 18 is disposed so as to correspond to lower portions of the side cowls 15 and a front lower portion and a lower end portion of the motorcycle body frame 20. Specifically, the frame slider 18 is formed by joining a plurality of pipe members while bending the pipe members, and is configured by a protective structure that covers the lower portions of the side cowls 15 and the front lower portion and the lower end portion of the motorcycle body frame 20 from the outside in the motorcycle width direction. The frame slider 18 suppresses the grounding of the side cowls 15 and the motorcycle body frame 20 by coming into contact with a road surface G ahead of the side cowls 15 and the motorcycle body frame 20 when the motorcycle 1 turns over, and consequently suppresses the damages of the side cowls 15 and the motorcycle body frame 20.

The motorcycle 1 according to the present embodiment has a fog lamp unit 30 as an accessory to be selectively attached.

The fog lamp unit 30 has a pair of fog lamps 31 in the motorcycle width direction, a support bar 32 that extends along peripheries of the side cowls 15 from both sides to the front thereof and supports the pair of fog lamps 31, and a pair of fixed portions 33 provided at both rear end portions of the support bar 32. The fog lamp unit 30 is fastened to the accessory fixing portion 24c of the front cowl stay 24 by a fastening bolt 94 (see FIG. 5) at the pair of fixed portions 33.

Here, the motorcycle 1 according to the present embodiment further has a pair of left and right cowl covers 50 that are attached to the side cowls 15 from the outside in the motorcycle width direction. The cowl cover 50 is molded with a colored resin, is unpainted, and exhibits the color of the molded resin material itself. In the present embodiment, the cowl cover 50 has a black color in which scratches are inconspicuous.

The cowl cover 50 partially covers an upper portion at a rear portion of the side cowl 15 from the outside in the motorcycle width direction, and is smaller than the side cowl 15. Specifically, the cowl cover 50 has a size smaller than that of the side cowl 15 in side view. The cowl cover 50 is formed in a substantially polygonal shape having an apex at the upper end portion, specifically, a pentagonal shape in the side view illustrated in FIG. 1. However, the shape of the cowl cover 50 is not limited thereto. The cowl cover 50 is located behind the front fork 4 and the upper end portion is located above the driver's seat 14. Referring to FIG. 3, the cowl cover 50 is located above the radiator vent 15c.

Specifically, the cowl cover 50 is located at an upper portion of portions of the side cowl 15 that are adjacent to the front side of the knee grip portion 15f. That is, the cowl cover 50 is located adjacent to the front side of the knee grip portion 13d of the fuel tank 13. As described above, since a width of a portion of the cowl cover 50 located in front of the knee grip portion 15f gradually decreases to the front in the motorcycle width direction and the knee grip portion 15f is inclined downward toward the front from the upper end portion, a portion located above portions adjacent to the front side of the knee grip portion 15f is formed to be the widest. Thus, the cowl cover 50 attached to the side cowl 15 protrudes outward in the motorcycle width direction from the side cowl 15 in a region in a height direction, in which the cowl cover 50 is attached. The cowl cover 50 covers a height location of the side cowl 15 which is the same region as a height location of an upper edge of the seat 14.

Figure 4:
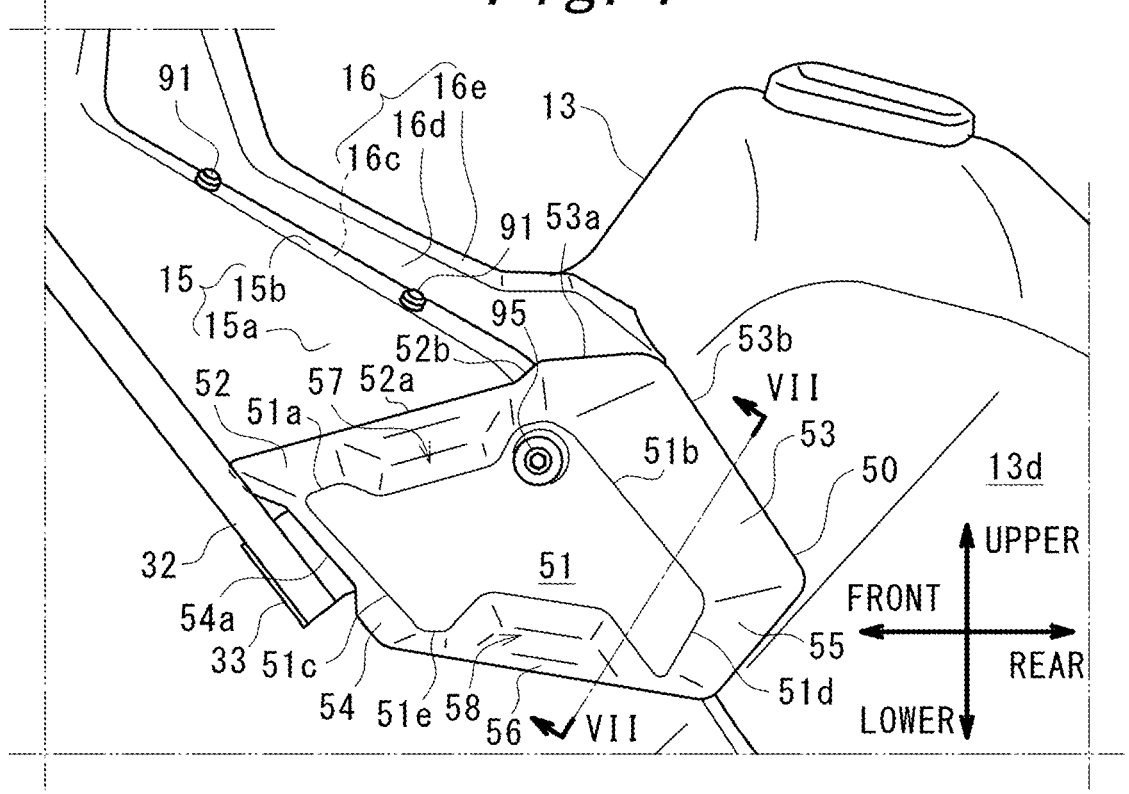
FIG. 4 is a side view illustrating a periphery of a cowl cover in an enlarged manner.

FIG. 4 is a left side view of the motorcycle 1 in which a periphery of the cowl cover 50 is enlarged. As illustrated in FIG. 4, the cowl cover 50 is provided so as to cover a rear portion of the meter panel 16 and a front portion of the fuel tank 13 in addition to the rear portion of the side cowl 15 from the outside in the motorcycle width direction. In other words, the cowl cover 50 covers a periphery of a boundary line intersecting three members between the side cowl 15, the meter panel 16, and the fuel tank 13 from the outside in the motorcycle width direction. Specifically, the cowl cover 50 is located adjacent to the front side of the knee grip portion 13d with respect to the fuel tank 13, is located at a substantially intermediate portion in the up-down direction of the front end portion of the fuel tank 13, and covers a portion bulged most to the outside in the motorcycle width direction from the outside in the motorcycle width direction. The cowl cover 50 covers a portion which is located most to the outside in the motorcycle width direction, of a portion adjacent to the front side of the knee grip portion 15f, of the side cowl 15, from the outside in the motorcycle width direction. A boundary between the side cowl 15, the meter panel 16 and the fuel tank 13 is inconspicuous by the cowl cover 50.

Referring back to FIG. 1, a dimension of the cowl cover 50 in the front-rear direction is about half a dimension of the side cowl 15 in the front-rear direction in a height range in which the cowl cover 50 is provided. A front-rear length of the cowl cover 50 is formed so as to have a length that covers at least from a front edge of the knee grip portion 13d of the fuel tank 13 to the accessory fixing portion. A rear end edge of the cowl cover 50 extends in the up-down direction along the front edge of the knee grip portion 13d. As will be described later, the cowl cover 50 covers the fastening bolts 91 for fixing the side cowl 15 to the meter panel 16 from the outside in the motorcycle width direction (see FIG. 5). The cowl cover 50 covers a boundary region between the fuel tank 13 and the side cowl 15 to be exposed from the outside in the motorcycle width direction in top view. The cowl cover 50 is disposed so as to cover the same height location or a higher location on the side cowl 15 with respect to a central location of the fuel tank 13 in the up-down direction.

The cowl cover 50 is formed so as to cover a portion of a boundary portion between the side cowl 15 and the lower edge portion front portion 13a of the fuel tank, 13 that is exposed as viewed by the driver. As described above, since the fuel tank 13 is inclined and extends forward and upward and is formed to be wider to the front, the upper half of the lower edge portion front portion 13a is further bulged to the outside in the motorcycle width direction. Thus, at least the portion of the fuel tank 13 further bulged to the outside in the motorcycle width direction is covered by the cowl cover 50. It is preferable to provide the cowl cover 50 so as to cover the portion of the fuel tank 13 bulged most to the outside in the motorcycle width direction as in the present embodiment.

Figure 5:
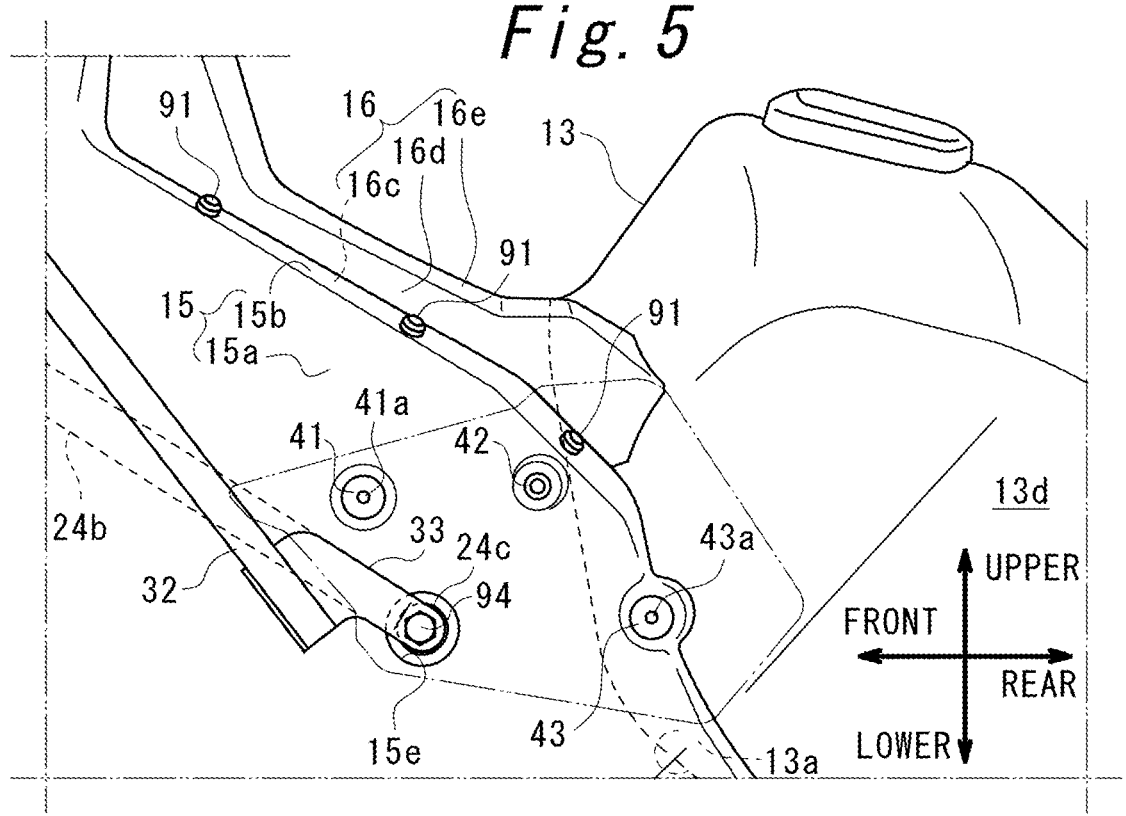
FIG. 5 is a side view illustrating a state in which the cowl cover is removed from a state of FIG. 4.

FIG. 5 is a left side view of the motorcycle 1 illustrating a state in which the cowl cover 50 is removed from the state of FIG. 4. As illustrated in FIG. 5, the side cowl 15 has first to third fixing portions 41 to 43 for fixing the cowl cover 50 in order from the front. The first and third fixing portions 41 and 43 are so-called plug-in type grommets which are elastic members (for example, made of rubber), and have through holes 41a and 43a penetrating in the motorcycle width direction.

The second fixing portion 42 is located at a location spatially dispersed from the fuel tank 13 in side view, specifically, located in front of the lower edge portion front portion 13a. The second fixing portion 42 has a female screw portion fixed by fastening, and is configured by a rubber nut in the present embodiment.

An opening portion 15e penetrating in the motorcycle width direction is provided at a location of the side cowl 15 corresponding to the accessory fixing portion 24c. The opening portion 15e and the accessory fixing portion 24c are covered from the outside in the motorcycle width direction by the cowl cover 50.

Figure 6:
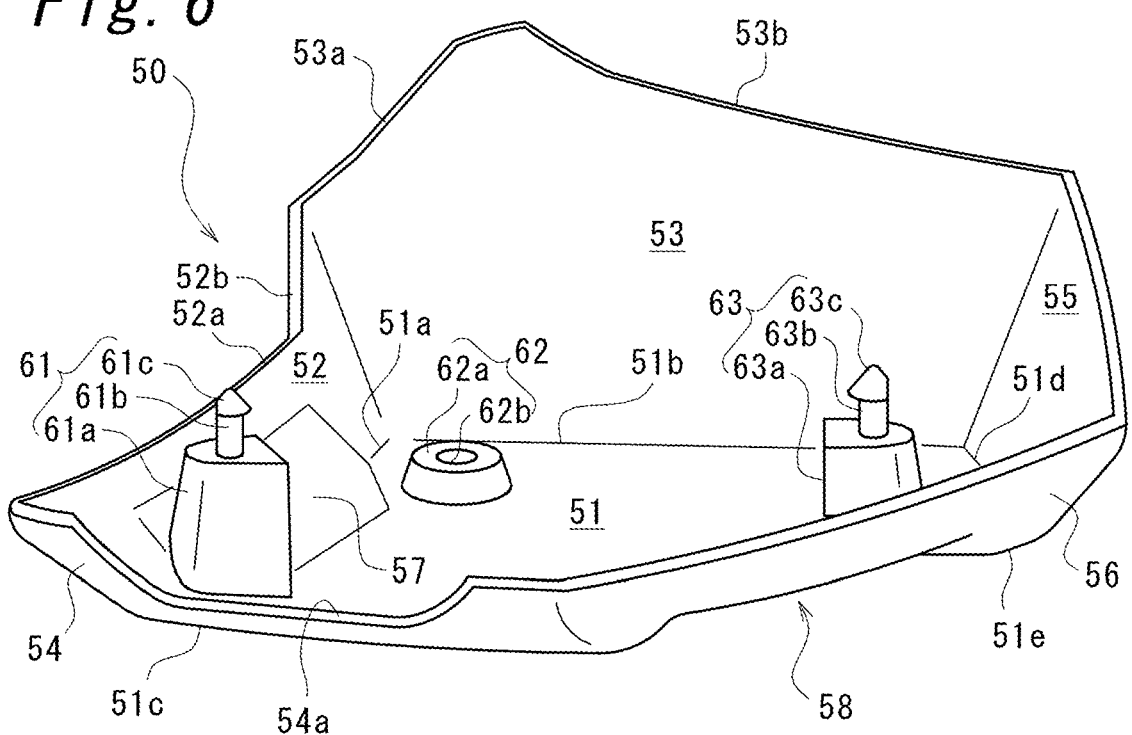
FIG. 6 is a perspective view of the cowl cover as viewed from an inside in a motorcycle width direction.

FIG. 6 is a perspective view of the single cowl cover 50 as viewed from the inside in the motorcycle width direction. As illustrated in FIGS. 4 and 6, the cowl cover 50 has a substantially pentagonal sidewall portion 51 that faces the side cowl 15 at a distance from the outside in the motorcycle width direction. The sidewall portion 51 is formed in a planar shape extending substantially parallel to the front-rear direction and the up-down direction.

One of apexes of the sidewall portion 51 is located at an uppermost portion of an upper end portion, and the sidewall portion 51 has an upper edge portion front portion 51a inclined downward to the front from the apex and an upper edge portion rear portion 51*b* inclined downward to the rear from the apex. The sidewall portion 51 has a front edge portion 51*c* inclined downward to the rear at a front end portion, a rear edge portion 51*d* inclined downward to the front at a rear end portion, and a lower edge portion 51*e* inclined upward to the front at a lower end portion.

The cowl cover 50 has an upper wall portion front portion 52 extending to the inside in the motorcycle width direction from the upper edge portion front portion 51*a*, an upper wall portion rear portion 53 extending to the inside in the motorcycle width direction from the upper edge portion rear portion 51*b*, a front wall portion 54 extending to the inside in the motorcycle width direction from the front edge portion 51*c*, a rear wall portion 55 extending to the inside in the motorcycle width direction from the rear edge portion 51*d*, and a lower wall portion 56 extending to the inside in the motorcycle width direction from the lower edge portion 51*e*. That is, the cowl cover 50 is formed in a box shape in which the inside in the motorcycle width direction is open, and a space between the side cowl 15, the meter panel 16, and the fuel tank 13 is defined in a state of being attached to the side cowl 15. In the present specification, a case where the cowl cover is formed in the box shape means that the cowl cover is surrounded by a plurality of surface portions and is formed in a housing, but is not completely surrounded by not having one or a plurality of top surface portions, bottom surface portions, and side surface portions and is formed so as to be partially open to the outside.

The upper wall portion front portion 52 has, at inner edge portions in the motorcycle width direction, a first portion 52*a* of which an inner edge portion in the motorcycle width direction extends substantially parallel to the upper edge portion front portion 51*a*, and a second portion 52*b* extending so as to be inclined to the inside in the motorcycle width direction from the first portion 52*a*. The upper wall portion rear portion 53 has, at inner edge portions in the motorcycle width direction, a first portion 53*a* of which an inner edge portion in the motorcycle width direction extends substantially in the front-rear direction and a second portion 53*b* extending in a direction inclined downward to the rear from the first portion 53*a*.

First to third fixed portions 61 to 63 are formed in order from the front in a peripheral region of the sidewall portion 51. The first and third fixed portions 61 to 63 are located at locations corresponding to the first to third fixing portions 41 to 43 provided on the side cowl 15.

The first and third fixed portions 61 and 63 are pedestal portions 61*a* and 63*a* protruding to the inside in the motorcycle width direction from the sidewall portion 51, shaft portions 61*b* and 63*b* further extending to the inside in the motorcycle width direction from the pedestal portions 61*a* and 63*a*, and enlarged diameter portions 61*c* and 63*c* provided at tips of the shaft portions 61*b* and 63*b* and having outer diameters larger than those of the shaft portions 61*b* and 63*b*, respectively. The second fixed portion 62 has a seat surface portion 62*a* recessed to the inside in the motorcycle width direction and a tightening hole 62*b* penetrating the seat surface portion 62*a* in the motorcycle width direction.

The cowl cover 50 has an upper recess portion 57 recessed to the inside in the motorcycle width direction between the sidewall portion 51 and the upper wall portion front portion 52, and a lower recess portion 58 recessed to the inside in the motorcycle width direction between the sidewall portion 51 and the lower wall portion 56. Since the upper recess portion 57 and the lower recess portion 58 act like recessed ribs between the sidewall portion 51, and the upper wall portion front portion 52 and the lower wall portion 56, rigidity between these wall portions is increased. As a result, the rigidity of the cowl cover 50 in the motorcycle width direction is effectively increased.

A notch portion 54*a* penetrating in the front-rear direction is formed in the front wall portion 54. The notch portion 54*a* is formed such that a portion having a predetermined length in the edge portion located inside the front wall portion 54 in the motorcycle width direction is cut out with a predetermined length to the outside in the motorcycle width direction. In top view, the notch portion 54*a* is hidden by the upper wall portion front portion 52. Accordingly, the notch portion 54*a* can be prevented from being noticeable to the driver, and rainwater can be prevented from entering the inside of the cowl cover 50 through the notch portion 54*a*. Since the upper wall portion front portion 52 is formed so as to extend forward to the notch portion 54*a*, the support bar 32 extending from the fixed portion 33 can be covered from above by the cowl cover 50, and aesthetics can be further improved. As illustrated in FIG. 4, in a state in which the cowl cover 50 is attached to the side cowl 15, the fixed portion 33 of the fog lamp unit 30 extends from the inside to the outside of the cowl cover 50 through the notch portion 54*a* of the front wall portion 54. Accordingly, since the cowl cover 50 can be provided so as to cover the accessory fixing portion 24*c* and can cover the fixed portion 33 extending from the inside to the outside of the cowl cover 50 while suppressing an increase in a gap, deterioration in appearance is suppressed.

Figure 7:
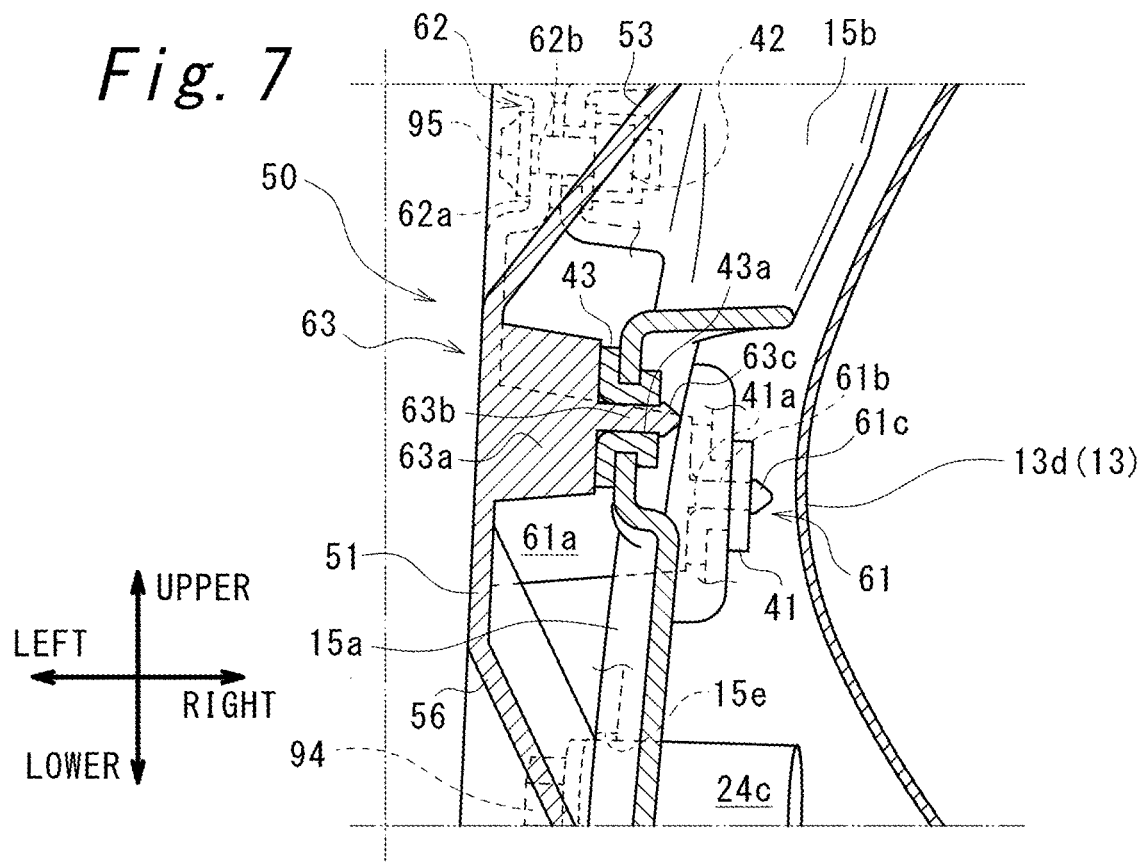
FIG. 7 is a cross-sectional view taken along a line VII-VII of FIG. 4.

FIG. 7 is a cross-sectional view of the third fixing portion 43 substantially in the up-down direction taken along a line VII-VII of FIG. 4. As illustrated in FIG. 7, in a state in which the cowl cover 50 is attached to the side cowl 15, the shaft portions 61*b* and 63*b* of the first and third fixed portions 61 and 63 are inserted into the through holes 41*a* and 43*a* of the first and third fixed portions 41 and 43, and the second fixed portion 62 is fixed to the second fixing portion 42 via a fastening bolt 95 by fastening.

The first fixing portion 41 is sandwiched in the motorcycle width direction by the pedestal portion 61*a* and the enlarged diameter portion 61*c* of the first fixed portion 61, and the third fixing portion 43 is sandwiched in the motorcycle width direction by the pedestal portion 63*a* and the enlarged diameter portion 63*c* of the third fixed portion 63. That is, the cowl cover 50 is fixed at the second fixing portion 42 by fastening, and is elastically supported by the grommet at the remaining first and third fixing portions 41 and 43. Accordingly, the cowl cover 50 can be removed from the side cowl 15 by removing the fastening bolt 95. That is, the cowl cover 50 is configured to be attachable and detachable from the side cowl 15. The cowl cover 50 may be fastened and fixed at at least one point, and may be fastened and fixed at a plurality of locations.

As illustrated in FIG. 4, in a state in which the cowl cover 50 is attached to the side cowl 15, the portions of the inner edge portions in the motorcycle width direction excluding the notch portion 54*a* substantially abut on the side cowl 15, the meter panel 16, and the fuel tank 13 from the outside in the motorcycle width direction. Specifically, of the inner edge portions of the upper wall portion front portion 52 in the motorcycle width direction, the first portion 52*a* substantially abuts on the cowl body 15*a* of the side cowl 15 from the outside in the motorcycle width direction, and the second portion 52*b* substantially abuts on the cowl upper wall portion 15*b* from above.

Of the inner edge portions of the upper wall portion rear portion 53 in the motorcycle width direction, the first portion 53a substantially abuts on the outer wall portion 16d of the meter panel 16 from the outside in the motorcycle width direction, and the second portion 53b substantially abuts on the side portion of the fuel tank 13 from the outside in the motorcycle width direction. Of the inner edge portions of the front wall portion 54 in the motorcycle width direction, the portions excluding the notch portion 54a substantially abut on the cowl body 15a of the side cowl 15 from the outside in the motorcycle width direction.

The inner edge portions of the rear wall portion 55 in the motorcycle width direction substantially abut on the side portion of the fuel tank 13 from the outside in the motorcycle width direction. As illustrated in FIG. 2, the upper wall portion rear portion 53 and the rear wall portion 55 extend so as to be inclined forward to the outside in the motorcycle width direction so as to be continuous with the knee grip portion 13d of the fuel tank 13. The inner edge portions of the lower wall portion 56 in the motorcycle width direction substantially abut on the cowl body 15a of the side cowl 15 from the outside in the motorcycle width direction.

As illustrated in FIG. 5, the bolt of the three fastening bolts 91, that is located on the rearmost side is located inside the cowl cover 50. That is, the cowl cover 50 also acts to hide one of the fastening bolts 91, and thus, the appearance is improved.

Next, the action of the cowl cover 50 when the motorcycle 1 turns over will be described with reference to FIG. 3. When the motorcycle 1 turns over, the motorcycle turns over such that a first ground line X1 (may be referred to as a bank line and is indicated by a dashed dotted line in FIG. 3) connecting the frame slider 18, and the front wheel 2 and the rear wheel 3 coincides with the road surface G. In this state, the side cowl 15, the meter panel 16, and the motorcycle body frame 20 do not come into contact with the road surface G.

Here, since the fuel tank 13 has a large capacity and is disposed at a high location as described above, the motorcycle 1 according to the present embodiment has a high center of gravity. Thus, the motorcycle 1 is easier to rotate further from a state in which the first ground line X1 coincides with the road surface G. Specifically, the motorcycle further rotates with the upper end portion of the frame slider 18 as a start point, and as a result, the cowl cover 50 is grounded to the road surface G.

That is, the motorcycle 1 further rotates such that a second ground line X2 (indicated by a dashed double-dotted line in FIG. 3) connecting the upper end portion of the frame slider 18 and the outer surface of the cowl cover 50 coincides with the road surface G. At this time, in the motorcycle 1, the upper end portion of the frame slider 18 and the outer surface of the cowl cover 50 are grounded to the road surface G. However, the side cowl 15, the meter panel 16, and the motorcycle body frame 20 are not grounded, and the fuel tank 13 is also not grounded.

Since the cowl cover 50 is formed in a box shape and a space is defined between the cowl cover 50 and the side cowl 15, the impact on the cowl cover 50 at the time of being grounded acts is absorbed by the space acting as a crushable zone. Since the inner edge portions of the cowl cover 50 in the motorcycle width direction are supported by substantially abutting on the side cowl 15, the meter panel 16, and the fuel tank 13, an impact load at the time of being grounded is easy to be dispersed to the side cowl 15, the meter panel 16, and fuel tank 13.

Since the fastening bolt 95 for fastening the cowl cover 50 to the side cowl 15 is located so as to be spatially dispersed with the fuel tank 13 in side view, the fastening bolt 95 does not interfere with the fuel tank 13 even though the fastening bolt 95 is displaced to the inside in the motorcycle width direction at the time of being grounded, and the damage of the fuel tank 13 is prevented.

According to the motorcycle 1 described above, the following effects are obtained.

(1) Since the cowl cover 50 protrudes outward in the motorcycle width direction from the side cowl 15 in the region in the height direction, in which the cowl cover 50 is attached, the cowl cover 50 is easy to be grounded ahead of the side cowl 15 when the motorcycle 1 turns over. Accordingly, the damage of the side cowl 15 is suppressed. Even though the cowl cover 50 is damaged, the cowl cover 50 is smaller than the side cowl 15, and thus, repair cost can be reduced as compared with a case where the side cowl 15 is replaced.

(2) Since the cowl cover 50 is formed in a box shape, the space defined between the cowl cover 50 and the side cowl 15 acts as the crushable zone. Accordingly, the cowl cover 50 can be deformed when the motorcycle turns over, and the damage of the side cowl 15 due to the deformation of the cowl cover 50 is suppressed while effectively absorbing energy due to the turnover.

(3) The cowl cover 50 can be firmly fixed to the side cowl 15 by fastening with the fastening bolt 95. On the other hand, when the impact load due to the grounding acts on the cowl cover 50 when the motorcycle turns over, the displacement of the cowl cover 50 with respect to the side cowl 15 with the second fixing portion 42 due to the fastening as a center is allowed in a displaceable range in the remaining first and third fixing portions 41 and 43 due to the elastic support. As a result, the impact load is easily released and the transmission of the impact load to the side cowl 15 is suppressed. Thus, the damage of the side cowl 15 at the time of turnover is further suppressed.

(4) Since the accessory fixing portion 24c is covered with the cowl cover 50 from the outside in the motorcycle width direction, the accessory fixing portion 24c can be hidden by the cowl cover 50. The suppression of the deterioration in the appearance by the accessory fixing portion 24c and the damage suppression of the cowl can be realized by one member.

(5) The fixed portion 33 of the fog lamp unit 30 can be disposed so as to extend from the accessory fixing portion 24c to the outside of the cowl cover 50 through the notch 54a of the cowl cover 50. Accordingly, most of the fog lamp unit 33 in the periphery of the fixed portion 33 can be covered with the cowl cover 50, and is easy to be covered while suppressing the deterioration of the appearance.

(6) Since the cowl cover 50 covers both the rear portion of the side cowl 15 and the front portion of the fuel tank 13 from the outside in the motorcycle width direction, the damage of the fuel tank 13 is easy to be suppressed in addition to the damage of the side cowl 15 by the cowl cover 50 at the time of a motorcycle turn over.

(7) Since the cowl cover 50 is located in front of the knee grip portions 13d and 15f formed on the fuel tank 13 and the side cowl 50, the interference of the cowl cover 50 with the legs of the occupant is suppressed. Accordingly, the deterioration of ride quality due to the cowl cover 50 is suppressed.

(8) Since the cowl cover 50 is attached to the side cowl 15, the cowl cover can be indirectly attached to the motorcycle body frame. Thus, since the impact on the cowl cover 50 to be grounded at the time of turnover is not directly transmitted to the motorcycle body frame 20, the impact transmitted to the motorcycle body frame 20 is reduced.

(9) Since the cowl cover 50 is molded with colored resin, is not painted, and exhibits the color of the molded resin material itself, even though the cowl cover 50 is damaged, a base having a color different from the front surface does not appear, and thus, the damage is inconspicuous. Since it is not necessary to paint the cowl cover at the time of repairing, the repair cost can be suppressed.

(10) Since the cowl cover 50 is provided in the region including the location overlapping the accessory fixing portion 24c in the motorcycle width direction, the impact received by the cowl cover 50 is transmitted to the support bar 32 that supports the accessory at the time of turnover. Accordingly, it is possible to prevent the side cowl 15 that supports the cowl cover 50 from having excessive support rigidity.

(11) In the cowl cover 50, the sidewall portion 51 which is the outer surface in the motorcycle width direction is formed so as to be substantially flat, and the first to third fixed portions 61 to 63 are provided in the peripheral region of the flat surface. Accordingly, in the cowl cover 50, since the sidewall portion 51 is supported at the peripheral region, the impact is suppressed from being concentrated in one place at the time of turnover.

(12) The cowl cover 50 covers the height location of the side cowl 15 which is the same region as the height position of the upper edge of the seat 14. Accordingly, the cowl cover 50 can be disposed on a relatively upper side, and can receive an impact on the upper side of the motorcycle body due to a moment action of the angular displacement of the motorcycle body around a front-rear axis at the time of turnover.

Although the case where the cowl cover 50 is attached to the side cowl 15 that also serves as the radiator shroud has been described as an example in the above embodiment, the present invention is not limited thereto. The present invention can also be suitably applied when the side cowl 15 is merely a cowl.

Although the motorcycle 1 including the frame slider 18 at the front lower portion of the motorcycle body frame 20 has been described as an example in the above embodiment, the present invention is not limited thereto. The present invention can also be suitably implemented on a motorcycle that does not include the frame slider 18. For example, the cowl cover may be provided so as to protrude from the bank line. In this case, as the cowl cover is provided below the motorcycle, the cowl cover is easy to protrude from the bank line, and it is easy to suppress the amount of protrusion. The cowl cover may be provided in consideration of the ground portion of the motorcycle at the time of turnover based on the center of gravity of the motorcycle. In the above embodiment, the motorcycle body frame 20 includes the upper frame member 21, the lower frame member 22, and the rear frame member 23, but the present invention is not limited thereto. For example, the present invention can be applied to a motorcycle body frame 20 that does not have the lower frame member 22. The present invention can be applied even when the front cowl stay 24 does not include the accessory fixing portion 24c and does not include the accessory such as the fog lamp unit 30.

In the above embodiment, the cowl cover is molded with the colored resin and is used without being painted, but may be painted. A degree of freedom in design can be increased by painting the cowl cover, but it is preferable that the cowl cover is molded with the colored resin and is unpainted in order to reduce the repair cost.

The present invention is not limited to the examples illustrated in the above embodiment, and various modifications and changes can be made without departing from the spirit and scope of the present invention described in the claims.

What is claimed is:

1. A motorcycle comprising:
   a side cowl covering a motorcycle body from an outside in a motorcycle width direction; and
   a cowl cover partially covering the side cowl from the outside in the motorcycle width direction, the cowl cover being smaller than the side cowl,
   wherein the cowl cover protrudes outward in the motorcycle width direction from the side cowl in a region in a height direction, in which the cowl cover is attached,
   wherein the cowl cover is fixed to the side cowl at a plurality of locations, and
   wherein the cowl cover is fixed at at least one of the plurality of locations by fastening, and is elastically fixed at at least one of the plurality of locations other than the at least one of the plurality of locations at which the cowl cover is fixed by fastening.

2. The motorcycle according to claim 1,
   wherein the cowl cover is formed in a box shape in which an inside in the motorcycle width direction is open, and
   wherein a space is formed between the cowl cover and the side cowl.

3. The motorcycle according to claim 1, the cowl cover is attached to the side cowl.

4. The motorcycle according to claim 1, further comprising:
   an accessory fixing portion for attaching an accessory to be selectively attached to the motorcycle body on the motorcycle body,
   wherein an opening portion is formed in a portion of the side cowl facing the accessory fixing portion, and
   wherein the opening portion is covered with the cowl cover from the outside in the motorcycle width direction.

5. The motorcycle according to claim 4, wherein a notch is formed in an edge portion of the cowl cover on an inside in the motorcycle width direction.

6. A motorcycle comprising:
   a side cowl covering a motorcycle body from an outside in a motorcycle width direction;
   a cowl cover partially covering the side cowl from the outside in the motorcycle width direction, the cowl cover being smaller than the side cowl, and
   a fuel tank,
   wherein the cowl cover protrudes outward in the motorcycle width direction from the side cowl in a region in a height direction, in which the cowl cover is attached,
   wherein the fuel tank is located so as to be adjacent to the side cowl, and
   wherein the cowl cover covers both at least a part of the side cowl and at least a part of the fuel tank from the outside in the motorcycle width direction.

7. A motorcycle comprising:
   a side cowl covering a motorcycle body from an outside in a motorcycle width direction; and
   a cowl cover partially covering the side cowl from the outside in the motorcycle width direction, the cowl cover being smaller than the side cowl,
   wherein the cowl cover protrudes outward in the motorcycle width direction from the side cowl in a region in a height direction, in which the cowl cover is attached,
   wherein the motorcycle body has a knee grip portion sandwiched by legs of an occupant, and wherein the cowl cover is entirely located in front of the knee grip portion.

8. The motorcycle according to claim 1, wherein the cowl cover is formed of colored resin, and exhibits color of a material of molded resin itself.

\* \* \* \* \*